Jan. 30, 1973 A. J. MORETTI 3,714,377

STORE AND FORWARD SPEED CHANGER FOR OFF-LINE TRANSMISSION OF BINARY DATA

Filed March 16, 1966 2 Sheets-Sheet 1

INVENTOR.
ALFRED J. MORETTI

BY Anthony D. Cennamo
Paul W. Fish
ATTORNEYS

STORE AND FORWARD SPEED CHANGER FOR OFF-LINE TRANSMISSION OF BINARY DATA

Filed March 16, 1966

INVENTOR.
ALFRED J. MORETTI

BY Anthony D. Cennamo
Paul W. Fish
ATTORNEYS 3,714,377
Patented Jan. 30, 1973

3,714,377

STORE AND FORWARD SPEED CHANGER FOR OFF-LINE TRANSMISSION OF BINARY DATA

Alfred J. Moretti, Rochester, N.Y., assignor to Xerox Corporation, Rochester, N.Y.

Filed Mar. 16, 1966, Ser. No. 534,811
Int. Cl. H04j 3/18
U.S. Cl. 179—15.55 R 3 Claims

ABSTRACT OF THE DISCLOSURE

Graphic communication systems utilizing a store and forward speed changer apparatus for improving off-line transmission of binary data. Buffer units and speed changing apparatus is utilized for selectively altering the bit rate of information to be transmitted as a function of the respective bandwidth capabilities of the immediately utilized transmission media in a net type communication link.

This invention relates to graphic communication systems and, more particularly, to a store and forward speed changer apparatus for improving off-line transmission of binary data.

As is known in prior art facsimile systems, a document to be transmitted is scanned at a transmitting station to convert information on the document into a series of binary electrical signals. These video signals or carrier modulated signals corresponding thereto are then coupled to the input of a communication link interconnecting the transmitter with a receiver. At the receiving station, the video signals, in conjunction with suitable synchronizing signals, selectively control the actuation of appropriate marking means to generate a facsimile of the document transmitted.

It is often desirable to arrange facsimile and other communication terminals in a net type configuration. For example, it may be required that the output binary information from an electronic computer be transmitted to one or more of a number of remote locations for output printing or for permanent or temporary storage and subsequent readout. A net type transmission system would be necessary for such transfer of computer output information to such remote locations.

When there is only a transmitter and receiver connected by a single transmission medium, the binary information may be transmitted at a rate compatible with the maximum bandwidth capability of such transmission medium. However, when there are a plurality of transmitters and receivers at widely separated locations, the interconnecting transmission networks may be of different bandwidth capabilities. While it is possible to construct a net type transmission network with a predetermined bandwidth to match the design output from the transmitters to the receivers, this approach is generally prohibitively expensive. Thus, particularly when the remote or satellite stations are scattered over a large area, existing transmission media must be used as available. Commercially available transmission media as provided by public utilities may be of varying bandwidth capabilities depending upon the local area and amount of traffic therein.

In a net type communication link, a transmitter at one time may be transmitting at a rate compatible with the maximum bandwidth capability of the transmission medium to one remote location; however, upon transmission to another remote location, the transmission bandwidth capability of the medium may be different and thus the line may not be utilized to its fullest extent. That is, the transmission lines between the several remote locations may be of varying bandwidths and while between two selected locations the transmission capability of the line may be used to its fullest extent, the line available between two other remote locations may be of larger or smaller bandwidth. The problem exists, therefore, that a large capacity line may be used only for a low capacity information block, thus limiting the usefulness of such large capacity line. The rental costs of larger lines increase with the capacity of the line and the inefficient use of such a larger line increases the overall cost involved in using the system.

It is, accordingly, an object of the present invention to optimize the transmission efficiency of a binary transmission system.

It is another object of the present invention to provide methods and apparatus for operating net type data communication links at increased transmission efficiency.

It is another object of the present invention to provide methods and apparatus for a store and forward speed changing device for off-line operation in a binary net type transmission system.

It is another object of the present invention to utilize the several transmission lines in a net type data transmission system near their respective peak bandwidth capability.

In accomplishing the above objects and other desirable aspects, applicant has invented improved methods and novel apparatus for selectively altering the bit rate of information to be transmitted as a function of the respective bandwidth capabilities of the immediately utilized transmission media of a net type communication link. In accordance with a first aspect of the present invention, information to be transmitted is first coupled at the transmission rate of the transmitter via alternate sections of a buffer memory to a high capacity, start-stop, constant speed recording memory. At the appropriate time for retransmission, the information, preferably on a complete message basis, is alternately read back to the respective sections of the buffer memory and then read out from the buffer memory by a variable frequency clock at a bit rate compatible with the capability of the output transmission link.

In accordance with a second embodiment of the present invention, storage and selective speed changing is accomplished by utilizing a variable speed recorder. Instead of pulsing the buffer store at a rate compatible with the output transmission medium, as in the first embodiment, the recorder selectively operates at a readback speed compatible with the bandwidth limitations of that specific output transmission medium. The variable playback speed aspect of the recorder facilitates the bit rate change to an information bit rate compatible with any transmission medium available at the satellite location.

The requirements for speed changing could occur whenever the communication network utilizes lines of different bandwidths or whenever binary data information is to be exchanged between apparatus operating at different speeds. The speed changing apparatus of the present invention is equally applicable in either case to convert the binary information transmission rate between input and output lines of a communication link.

For a more complete understanding of the invention, as well as other objects and further features thereof, reference may be had to the following detailed description in conjunction with the drawings wherein.

Figure 1:
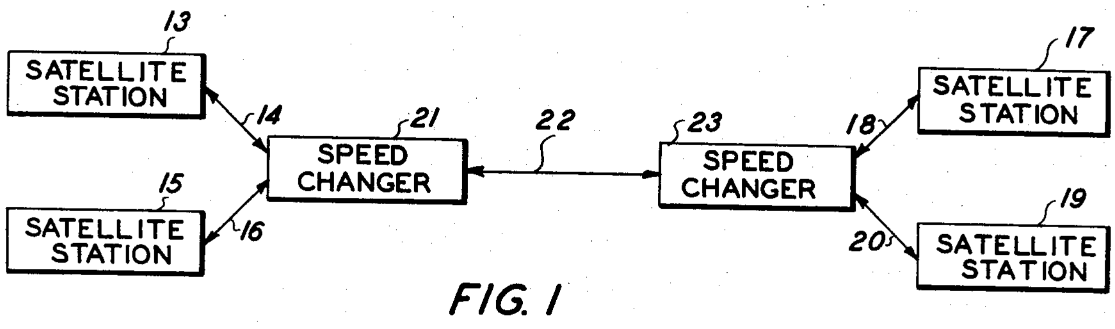
FIG. 1 is a block diagram of one embodiment of the principles of the present invention wherein the store and forward system is centrally located among remote transmitter and receiver stations.

Referring now to FIG. 1, a system is shown with two remotely separated speed changers 21 and 23 coupled by a high information capacity trunk line 22. Associated with speed changers 21 are satellite stations 13 and 15 coupled thereto by low information capacity transmission links 14 and 16. Satellite stations 17 and 19 are similarly associated with speed changer 23 and coupled thereto by low information capacity links 18 and 20. The transmission links 14, 16, 18 and 20 may be of varying bandwidth capabilities as determined by the availability of lines and amount of local traffic.

Through the speed changers 21 and 23, the operation of which will be hereinafter more fully described, and high information capacity trunk line 22, the satellite stations 13 and 15 may intercommunicate with satellite stations 17 and 19. The satellite stations 13, 15, 17 and 19 may be facsimile machines, electronic computers or the like. While only four such satellite stations are shown and described, as would be apparent, more stations and associated transmission media could be added to the system without changing the scope of the invention.

Assume now for purposes of example that it is desired that satellite station 13 communicate with satellite station 15. Because of system limitations and availability of communication lines, however, transmission media 14 and 16 may be of different bandwidth capability. Normal telephone lines have a bandwidth in the order of 3 kilocycles. However, special trunk lines having a bandwidth in the order of 250 kilocycles and higher are available. Assuming that line 14 has a bandwidth of 3 kilocycles and that line 16 has a bandwidth of 50 kilocycles, transmission times or information rates along line 14 will be considerably slower than that along line 16. To transmit any faster along line 14 would result in loss of information, as the bandwidth would be exceeded. However, line 16 and its bandwidth of 50 kilocycles is capable of much faster and much higher information rates so that to transmit only the information capable of transmission on line 14 to line 16 would not be utilizing the full capability of line 16. Inasmuch as larger bandwidth capability lines are more expensive to rent, it is desirable to transmit the information over such line as quickly as possible at a rate approaching the bandwidth capability of that line. Thus, in accordance with the invention, information from satellite station 13 would travel to speed changer 21 near the maximum bandwidth capability of line 14 of 3 kilocycles. The information would be stored temporarily at speed changer 21 and, when it is desired to transmit such information to satellite station 15, such transmission will take place at the bit rate of line 16 of 50 kilocycles. Both lines are thus being used to their maximum bandwidth capability.

If it is desired, in FIG. 1, to transmit information from satellite station 13 to satellite station 17, for example, the information would be first transmitted at the 3 kilocycle rate on line 14 to speed changer 21. The information is then stored temporarily for read-back at a higher bit rate over broadband trunk line 22 which, for example, would have a bandwidth of 250 kilocycles, to speed changer 23. The information is then temporarily stored and read back at the rate of line 18 at 50 kilocycles, for example, for distribution to satellite station 17. Thus, the limitations of the transmission lines associated with the various satellite stations can be compensated for by the use of the speed changers 21 and 23 to convert the information bit rate to conform with the bandwidth capability of the respective transmission link.

Figure 2:
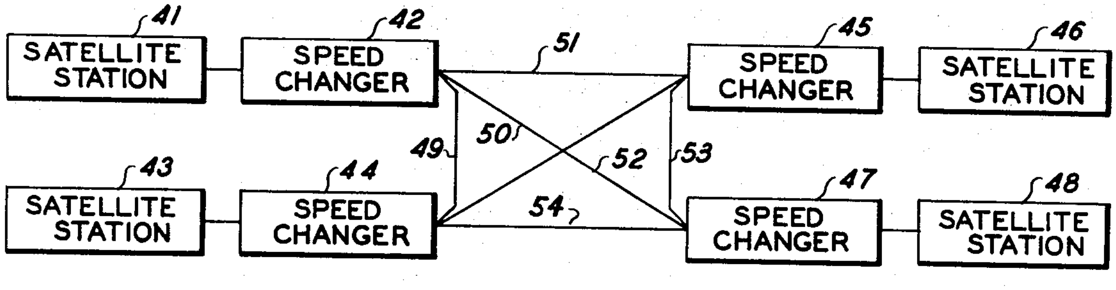
FIG. 2 is a block diagram of another embodiment of the principles of the present invention wherein the store and forward systems are located at the remote locations in the transmission system.

FIG. 2 shows a second aspect of the invention wherein the speed changers are located at the satellite stations themselves. Again, in consideration of system limitations and availability of communication links, lines 49 to 54 may be of different bandwidths and thus different information bit rate capabilities. Thus, if it is desired, for instance, to transmit from satellite station 41 to satellite station 46, then the speed changer 42 will change the speed of the transmission to match the bandwidth of line 51, while speed changer 45 changes the speed of information flow, back to where it can be fully utilized by satellite station 46.

If the satellite station 48 is to be the receiver, then the speed changer 42 will alter the speed of transmission to match the bandwidth capability of line 50, and so on. As each of the satellite stations 41, 43, 46 and 48 may contain receiving and transmitting devices, similar operations would be carried out in speed changers 42, 44, 45 and 47. The system in FIG. 2 is particularly adaptable to existing transmission systems wherein lines are already being leased and the stations installed. As it would be highly expensive to alter the communication system to a centrally located switching network, the speed changers thus may be located as shown at the satellite stations themselves.

Figure 3:
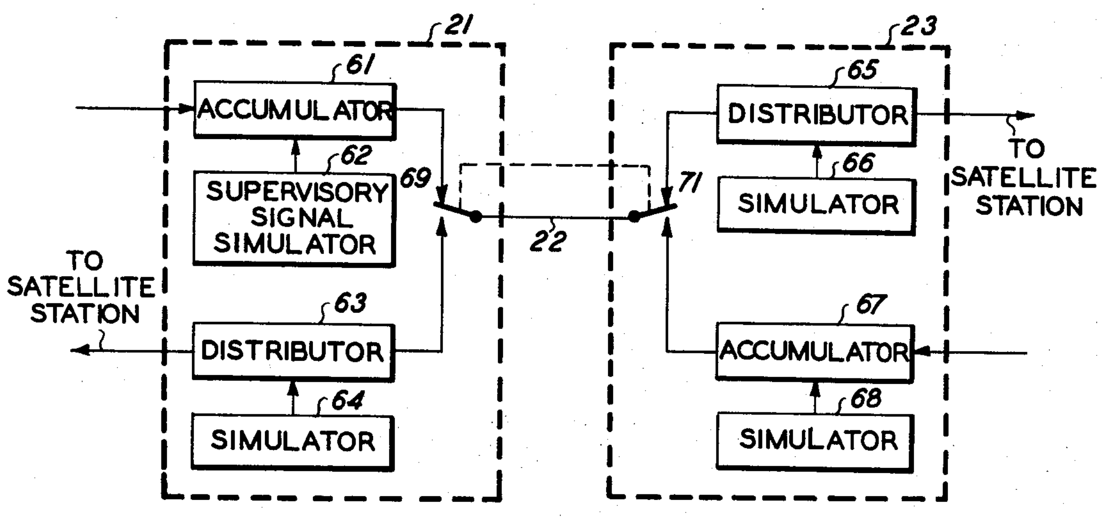
FIG. 3 is a block diagram of the store and forward speed changing apparatus compatible with the embodiments illustrated in FIG. 1 or FIG. 2.

FIG. 3 is a block diagram of speed changers 21 and 23 as illustrated in the system of FIG. 1. It can be seen, however, that the speed changers are identical to those in FIG. 2 also, without the addition of the plurality of transmission lines shown. Information from a satellite station would be an input to an accumulator 61, which accumulates the information until the end of the input information segment. When the switches 69 and 71 are in the position shown, the accumulator 61 would read out the information stored therein at the designated bandwidth capability of trunk line 22 to distributor 65. The information is stored temporarily in distributor 65 and, at the end of such input information segment, will read back the information at the rate of the bandwidth capability of the line to the associated satellite station. The speed changing can be automatically accomplished in the buffer located within the accumulators 61 and 67 and distributors 63 and 65 by selecting appropriate readout clock frequencies for generating bit rates at the information bit rate compatible with the maximum bandwidth capability of the output transmission link, as will hereinafter be more fully described in conjunction with FIGS. 4 and 5.

During the readout time, distributor 63, which already may have information stored therein by a previous transmission, can be feeding out the information to its associated satellite station. In addition, accumulator 67 could be accumulating information from its associated satellite station for subsequent readout to another remote satellite station. Thus, when switches 69 and 71 are thrown to the other position, accumulator 67 will transmit its stored information over line 22 to distributor 63 for subsequent distribution to the satellite station associated with it. At the same time, accumulator 61 would be accumulating information from a satellite station and distributor 65 could be distributing its stored information to its associated satellite station. Switches 69 and 71 must be actuated at the same time by any conventional supervisory control method.

Associated with accumulators 61 and 67 and with distributors 63 and 65 are scanner/printer simulators 62, 64, 66 and 68 for use when the system is used for facsimile transmission. Before a scanner is to transmit its information to a printer, reverse control signals must be received, such as printer ready, start scan, and so on. To maintain a closed loop configuration for supervisory signals, over a separate supervisory channel or other method, it is necessary to provide a scanner simulator at the store and forward unit. Thus, when information is received at accumulators 61 and 67, the simulators 62 and 68 would develop an idle scan pattern containing the necessary reverse control signals as determined by the scanner apparatus used.

In a similar manner, distributors 63 and 65 must receive reverse control signals before the transmission of the stored information. As in the case above, when the accumulator simulates a printer, the distributor in simulating a scanner must receive simulated printer supervisory signals, over a separate supervisory channel, for example. Simulators 64 and 68 are provided to maintain the closed loop configuration for supervisory channels by simulating a printer. The above discussion was limited to facsimile transmission apparatus, but it is apparent that such supervisory simulators may be present in other binary data transmissions, as a computer, for example.

Figures 4A, 4B, 5:
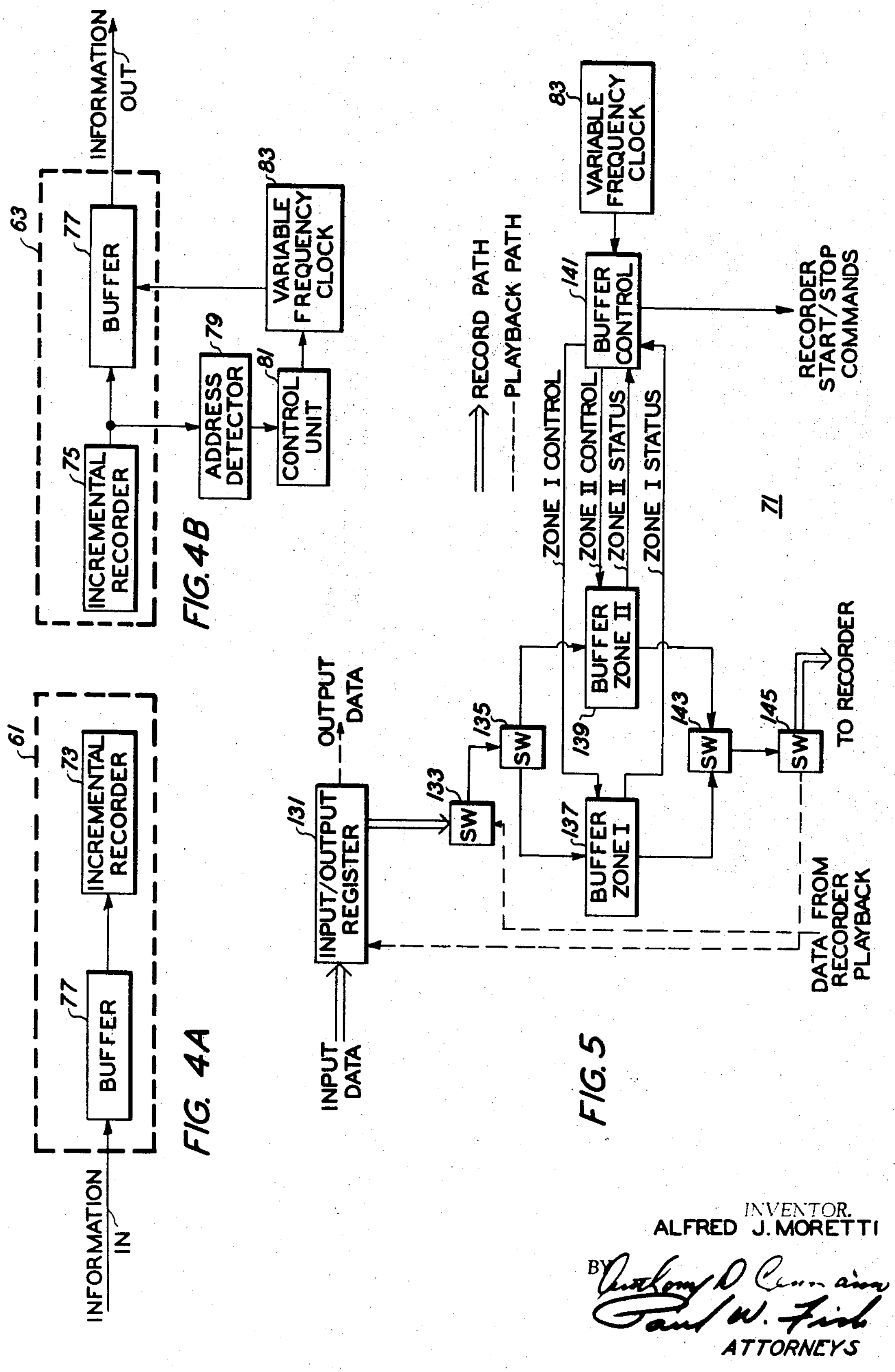
FIG. 4A and FIG. 4B are block diagrams illustrating further details of store and forward speed changing apparatus as shown in FIG. 3.
FIG. 5 is a schematic diagram of a buffer store system that is compatible with the embodiments illustrated in FIGS. 1 to 4.

FIG. 4A is a block diagram showing the internal components of accumulator 61 in FIG. 3. In a first embodiment, the digital binary information from a satellite station including address signals denoting the desired receiving station will be transmitted at a rate compatible with the maximum bandwidth capability of the line and stored in buffer store 77. Such buffer 77, which is hereinafter described in more detail, is divided electrically into two zones. Each zone is designed to be able to store a predetermined amount of binary information words. Thus, the information input will be fed to the first zone which will be filled, i.e., loaded into its memory store, at the input rate. When the first buffer zone is completely filled, the information will be transferred to the second zone which begins filling. At this time, incremental tape recorder 73 has been started and the binary information stored in the first buffer zone is then transferred out and recorded as a first block of information in the incremental start-stop recorder. As the first buffer zone completes the transfer of its stored information, the tape recorder will stop. When the second zone is filled, the incremental recorder is started again and the information from the second zone is stored as another block of information on the incremental recorder. While the information from the second zone is being transferred to the recorder, the first zone is again being refilled with information. This operation continues until all the information fed into buffer 77 is completely recorded in information blocks in incremental recorder 73.

FIG. 4B shows the accumulator 63 operating as a distributor, as in FIG. 3. The same buffer unit 77 is utilized, switched to allow information to pass now from the incremental recorder 75 through the buffer 77 to the transmission line. That is, the incremental recorder 75 now reads back one block of recorded information pulses at a time in a start/stop operation alternately into the first and second buffer zones, as in the recording cycle. Depending upon the bandwidth of the transmission medium into which the information is now to be transferred, the buffer will be clocked at the bandwidth bit rate of that particular medium by variable frequency clock 83. The clock rate is determined by detecting the address of the receiving satellite station in address detector 79, which may comprise a plurality of logic shift registers, for example. A signal denoting the receiving satellite station and thus its connecting transmission link will be sent to control unit 81, essentially a counter. Thus, control unit 81 will pulse the variable frequency clock 83 at the rate that buffer 77 will transfer its stored information to the transmission link.

As one zone is filled, therefore, and the information from the recorder begins filling the second zone, the information stored in the first zone is transferred out to the transmission line at a clock rate compatible with the bandwidth capability of the line itself. Thus, upon readout from buffer 77, the transmission rate may be faster or slower than the information input depending upon the bandwidth of the transmission medium and its associated readout clock pulse rate.

When speed changing is involved in the disclosed systems, there may be dead time at either the transmission line between speed changers or at the satellite lines. A narrow bandwidth line between speed changers implies a longer transmission time than accumulation time, whereas a wide bandwidth line between speed changers implies the reverse situation. This dead time may be lessened by the addition of more storage units or using the transmission line only when required.

As a second embodiment of the disclosed store and forward invention, the speed changers as illustrated and described in conjunction with FIGS. 1, 2 and 3 may operate without the buffer unit as set forth in FIGS. 4 and 5. Such a speed changer may comprise a variable speed tape recorder and control apparatus for selecting a predetermined operating speed. Thus, an input information signal from a satellite station may be recorded at a predetermined speed. Upon readout, the recorder will be operated at a rate compatible with the bandwidth capability of the transmission medium. Applying this aspect to FIG. 2, for example, information from satellite station 41 will be recorded on speed changer 42, now consisting only of the variable speed tape recorder. The tape recorder will be able to operate at a variable readout speed to match the bit rate of the several transmission media coupled to it. Any of the other recorders associated with the other satellite stations would record at the speed at which the information was transmitted. The tape recorder would then change the bit speed of such recorded information upon transfer to the satellite station according to the operating speed of the equipment located at such satellite station.

Referring now to FIG. 5, a buffer unit, such as buffer unit 77, illustrated in FIGS. 4A and 4B, is shown in detail. This buffer is in two electrical parts, each selectively operable, for recording and playback characteristics as is needed in FIGS. 4A and 4B; however, separate buffers with recording or playback characteristics could be used if desired. Each buffer zone as disclosed may comprise a magnetic core matrix or an array of logic shift registers, as is well known in the art.

During the recording cycle, as described in conjunction with FIG. 4A, the input data from a satellite station, for example, is feed to input-output register 131. Such register 131 may be a logic shift register with the required number of stages to match the number of binary bits in each frame that is used as an input signal. Switch 133 will direct the output from the register either to buffer zone 137 or buffer zone 139 when the system is in the recording cycle. During this cycle, one or the other zones of the buffer will be loading under control of the input data clock from the variable frequency clock 83. Depending upon which buffer zone is being loaded, switch 135, upon command from buffer control 141, will direct the information to that particular zone.

When the buffer control 141 senses that buffer zone 137 is full, i.e., contains its maximum information capacity, a start command will be sent to the incremental recorder and, after the tape has reached operating speed, buffer zone 137 will read out its stored information to the recorder by means of switches 143 and 145. As soon as buffer zone 137 is filled, switch 135, upon command from the buffer control 141 will now direct the input pulse information to buffer zone 139. After the recorder reaches operating speed, the block of information recorded in buffer zone 137 will be transferred to the incremental recorder and it will then thereafter be stopped. For this method of operation, it is necessary that the loading time for a full buffer zone at the maximum data rate be greater than the aggregate time required for dumping a buffer zone and starting and stopping the recorder.

Buffer zone 137 will have been completely emptied and the recorder subsequently stopped before buffer zone 139 can be filled. At some later time, buffer zone 139 is noted as full by buffer control 141 and a command signal is sent to the recorder to begin recording again. Buffer zone 139 then releases its information to the recorder by means of switches 143 and 145 while buffer zone 137 is refilling itself again with binary information from the register 131. This alternate operation continues with the recorder starting and stopping and buffer zones 137 and 139 releasing its information in alternate fashion until all the desired information is recorded by the incremental recorder. The aforementioned switches may be electrically operated relays or selectively energized logic gates, for example.

When buffer 71 is to be used on read-back, as in FIG. 4B, switch 133 receives the data from the incremental recorder and directs the information to switch 135 which, upon signal from buffer control 141, alternately fills buffer zone 137 and buffer zone 139 as in the recording mode. The information recorded in discrete blocks on the incremental recorder is read back incrementally by the recorder in alternately filling the two zones in the buffer. Depending upon the bandwidth of the transmission medium to which the information is to be transferred, the variable frequency clock 83, as discussed in relation to FIG. 4B, will pulse buffer control 141 and subsequently the buffer zones such that the zones will transfer the information to the lines at the designed rate compatible with the bandwidth of the transmission medium. That is, information from the buffer zones 137 and 139 will be switched by switch 143 to switch 145. Switch 145 now directs the information to input-output register 131 instead of to the recorder as in the recording cycle and subsequently out to the transmission line. The buffer 71 in this manner is capable of intermediate storage of information passing in either direction. That is, buffer 71 is used both in the recording cycle and playback cycle.

At the input and output ends of a transmission line are circuits for providing compatibility between transmitter and receiver circuits and the transmission medium. These circuits commonly called data sets, provide impedance matching and power amplification and/or modulating apparatus. Such data sets may comprise line drivers or frequency shift keyer. A clock source of known frequency would also be provided for system synchronization. It is this clock frequency that is used by the variable frequency clock 83 to control the output rate from the zones in the buffer storage unit.

There has thus been disclosed methods and apparatus for store and forward speed changing for off-line bandwidth compression of a digital binary pulse train. The invention facilities data transfer operations between lines of varying bandwidths by compensating for such variation in information bit rate capabilities by changing the bit rate of the input and output information. The discussion has been limited to such binary data sources as a computer or facsimile scanner but as would be apparent, other data sources may also be used, such as television, control signals, or radio transmission. Thus, while the present invention, as to its objects and advantages, as described herein, has been described in specific embodiments thereof, it is to be understood to be illustrative only and not to be limiting. It is applicant's intention, therefore, to be limited only by the scope of the appended claims.

What is claimed is:

1. In a data communication system including a plurality of transmitting stations and a plurality of receiving stations, the combination comprising:

a central switching center, a plurality of transmission paths with respective transmission binary bit rates selectively linking individual ones of said transmitting stations and said receiving stations with said central switching center, speed changing means at said central switching center for converting the binary bit rate at which information is capable of being transmitted over any one of said transmission paths to said switching center to the binary bit rate at which information is capable of being transmitted over any other of said transmission paths to at least one of said receiving stations, said speed changing means comprising:

first buffer storage means for storing successive portions of an input information signal, incremental recorder means operable in a stop/start manner for recording at a first bit rate said successive input information signals upon transfer from said first buffer storage means, and second buffer storage means for storing successive portions of said input information signal upon readout from said incremental recorder means, and control means for selectively connecting the output of said speed changing means to the transmission path to at least one of said receiving stations.

2. In a data communication system, the combination comprising:

means for generating binary pulse waveforms representative of information to be transmitted, first transmission line means of a first bandwidth capability coupled to said generating means, a plurality of means for receiving said binary pulse waveforms, a plurality of second transmission line means individually coupled to said plurality of receiving means wherein the bandwidth of at least one of said second transmission line means differs from the bandwidth of said first transmission line means, and speed changing means coupled to said first and plurality of second transmission line means for converting the binary bit rate at which information is capable of being transmitted over said first transmission line means to the binary bit rate at which information is capable of being transmitted over at least one of said plurality of second transmission line means, said speed changing means comprising:

first buffer storage means for storing successive portions of said binary pulse waveforms, incremental recorder means for recording at a first binary bit rate said successive waveform portions upon transfer from said first buffer storage means, second buffer storage means for storing said successive portions of said binary pulse waveforms upon read out from said incremental recording means, and means for pulsing said second buffer storage means for causing the stored information to be read out at binary bit rate compatible with the bandwidth of said second transmission line.

3. The combination as defined in claim 2 wherein:

said binary pulse waveforms include address signals representative of said means for receiving said binary pulse waveforms, said pulsing means comprise address detection means for detecting said address, control means responsive to said address detection means for determining the binary bit rate at which said second buffer storage means is to be pulsed, clock generating means responsive to said control means for pulsing said second buffer storage means at the binary bit rate compatible with the maximum bandwidth capability of at least one of said plurality of second transmission line means.

References Cited

UNITED STATES PATENTS

| | | | |
|---|---|---|---|
| 1,624,596 | 3/1927 | Hartley | 179—15 |
| 3,027,425 | 3/1962 | Tannenbaum et al. | 179—15.55 |
| 3,147,339 | 9/1964 | Silberg | 340—147 C |
| 3,310,779 | 3/1967 | Wagner | 179—15 |
| 3,006,986 | 10/1961 | Vernam et al. | 178—2 |

OTHER REFERENCES

Gryb, R. M.: "'Recorded Carrier' System for High-Speed Data Transmission," Bell Laboratories Record of September 1957, pp. 321–325.

ROBERT L. GRIFFIN, Primary Examiner

P. M. PECORI, Assistant Examiner

U.S. Cl. X.R.

179—2 DP, 15 AV, 15 BW; 178—Dig. 3; 325—51; 340—147 C